United States Patent [19]
Fraley, Jr.

[11] Patent Number: 5,884,890
[45] Date of Patent: Mar. 23, 1999

[54] SPRING LOADED CB ANTENNA MOUNT

[76] Inventor: John A. Fraley, Jr., 405 Sprankle Ave., Altoona, Pa. 16602

[21] Appl. No.: 31,425

[22] Filed: Feb. 26, 1998

[51] Int. Cl.[6] .................................................... A47G 25/12
[52] U.S. Cl. ............................................ 248/539; 343/715
[58] Field of Search ................................... 248/539, 468, 248/176.1, 229.12, 229.22, 231.41; 343/715, 892

[56] References Cited

U.S. PATENT DOCUMENTS

| | | | |
|---|---|---|---|
| 4,003,540 | 1/1977 | Hawks | 248/539 |
| 4,118,003 | 10/1978 | Dillow | 248/539 |
| 4,126,290 | 11/1978 | Drouillard | 248/539 X |
| 5,233,938 | 8/1993 | Lalo | 248/539 X |
| 5,453,756 | 9/1995 | Lowrey | 248/539 X |

*Primary Examiner*—Ramon O. Ramirez

[57] ABSTRACT

A releasably mounted antenna assembly is provided including a first member and a second member movably coupled to the first member. A spring is situated between the first member and the second member for urging the same together for coupling to an exterior of a vehicle. An antenna is mounted to one of the members and extends upwardly therefrom.

4 Claims, 2 Drawing Sheets

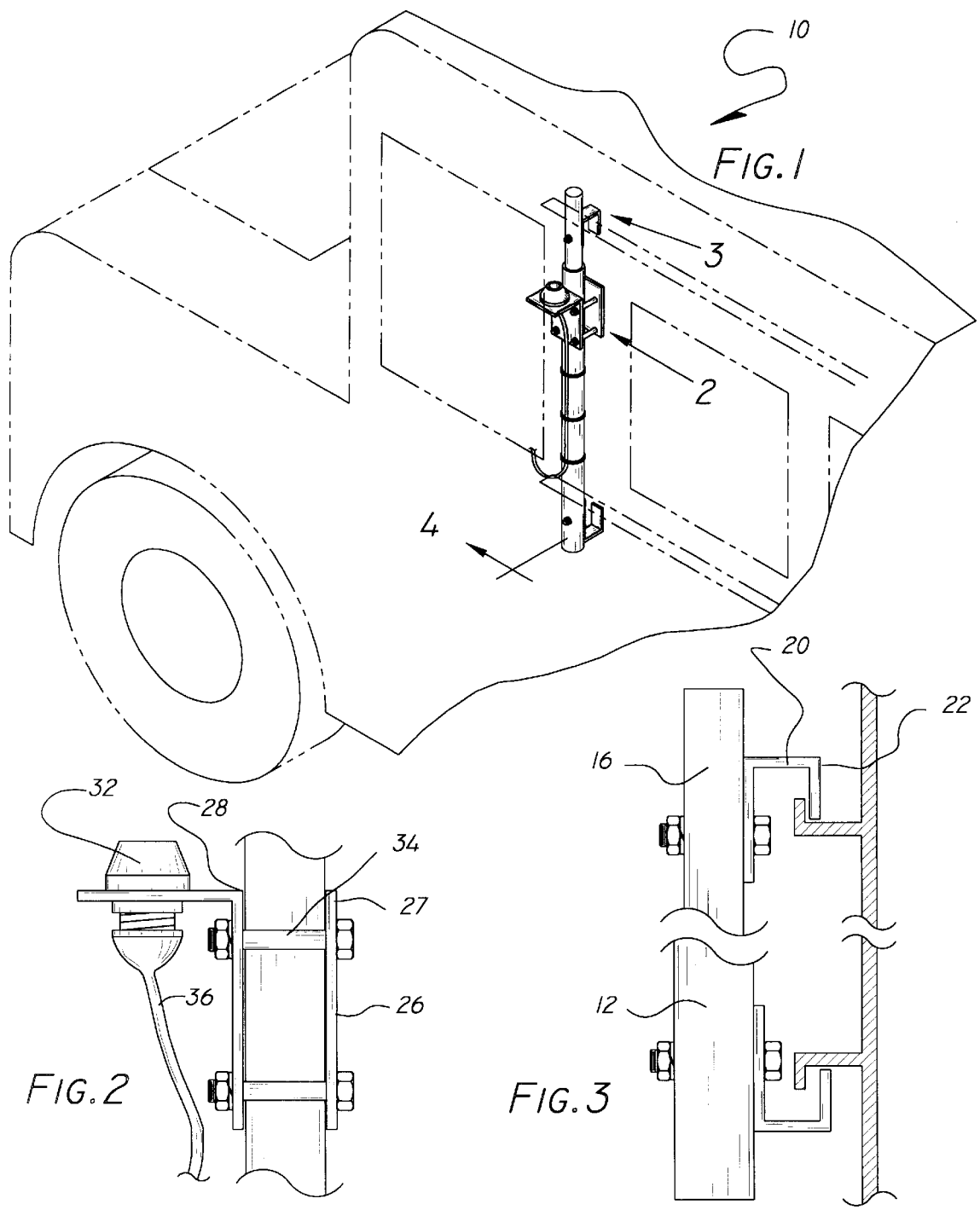

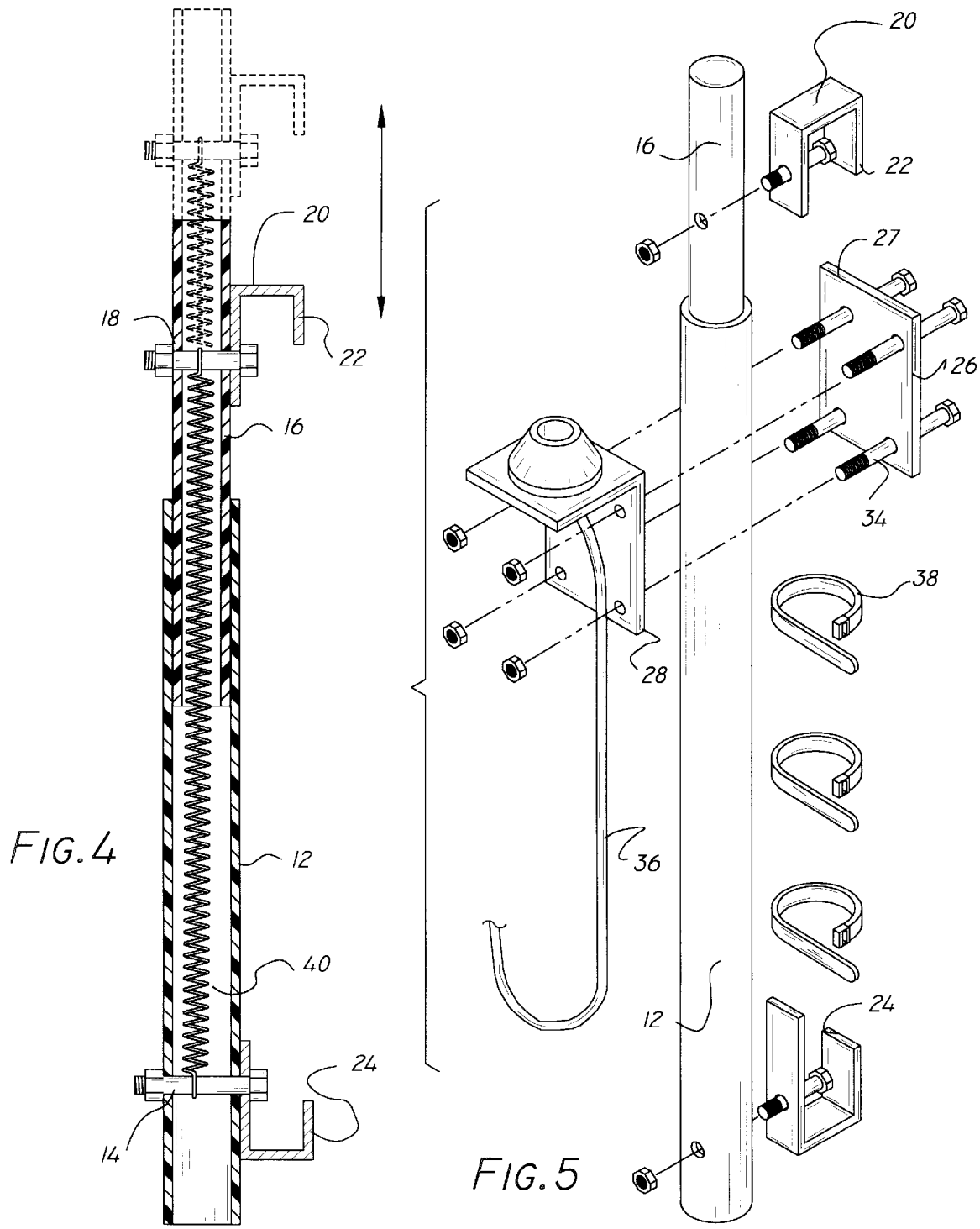

SPRING LOADED CB ANTENNA MOUNT

BACKGROUND OF THE INVENTION

1. Field of the Invention

The present invention relates to antenna mounting devices and more particularly pertains to a new spring loaded CB antenna mount for conveniently mounting a citizen band radio antenna to a vehicle without inflicting damage thereon.

2. Description of the Prior Art

The use of antenna mounting devices is known in the prior art. More specifically, antenna mounting devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art antenna mounting devices include U.S. Pat. No. 4,190,839; U.S. Pat. No. 5,225,845; U.S. Pat. Des. 343, 840; U.S. Pat. No. 4,692,770; U.S. Pat. No. 4,096,481; and U.S. Pat. No. 5,283,589.

In these respects, the spring loaded CB antenna mount according to the present invention substantially departs from the conventional concepts and designs of the prior art, and in so doing provides an apparatus primarily developed for the purpose of conveniently mounting a citizen band radio antenna to a vehicle without inflicting damage thereon.

SUMMARY OF THE INVENTION

In view of the foregoing disadvantages inherent in the known types of antenna mounting devices now present in the prior art, the present invention provides a new spring loaded CB antenna mount construction wherein the same can be utilized for conveniently mounting a citizen band radio antenna to a vehicle without inflicting damage thereon.

The general purpose of the present invention, which will be described subsequently in greater detail, is to provide a new spring loaded CB antenna mount apparatus and method which has many of the advantages of the antenna mounting devices mentioned heretofore and many novel features that result in a new spring loaded CB antenna mount which is not anticipated, rendered obvious, suggested, or even implied by any of the prior art antenna mounting devices, either alone or in any combination thereof.

To attain this, the present invention generally comprises a hollow rigid bottom pipe with a first diameter and having a pair of open ends. A pair of diametrically opposed bores are formed in a bottom end of the bottom pipe. Associated therewith is a hollow rigid top pipe with a second diameter less than the first diameter. The top pipe has a pair of open ends and a pair of diametrically opposed bores formed in a top end thereof. As shown in FIG. 4, a bottom of the top pipe is slidably situated within a top of the bottom pipe. Next provided is a pair of J-shaped hooks each formed of a planar rectangular inboard plate, outboard plate and interconnect plate. As shown in FIG. 5, the inboard plate of each hook has an aperture formed therein. The pair of J-shaped hooks include a first J-shaped hook having the inboard plate thereof mounted to the top of the top pipe via a bolt. Such bolt extends through the top pipe. When mounted, the first J-shaped hook is maintained inverted. The J-shaped hooks further include a second J-shaped hook having the inboard plate thereof mounted to the bottom of the bottom pipe. Similar to the first J-shaped hook, the second is mounted via a bolt which extends through the bottom pipe. The second J-shaped hook remains upright when mounted. Further included is an antenna mounting bracket having a planar rectangular first plate with a bore formed in each corner thereof. An inverted L-shaped second plate is provided with a bore formed in each corner of a vertical extent thereof. During use, an antenna is mounted to a horizontal extent of the second plate and extends upwardly in perpendicular relationship therewith. FIG. 2 shows the vertical extent of the second plate being maintained in abutment with the top of the bottom pipe via a plurality of bolts which extend through the bores of the first plate and subsequently through those of the vertical extent of the second plate. For preventing a wire associated with the antenna from remaining loose in the wind, a plurality of straps are coupled about the bottom pipe and situated about the wire. Note FIGS. 1 & 5. Finally, a spring is situated within the top and bottom pipe. Such spring is connected between the bolts thereof for urging the J-shaped hooks toward each other.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new spring loaded CB antenna mount apparatus and method which has many of the advantages of the antenna mounting devices mentioned heretofore and many novel features that result in a new spring loaded CB antenna mount which is not anticipated, rendered obvious, suggested, or even implied by any of the prior art antenna mounting devices, either alone or in any combination thereof.

It is another object of the present invention to provide a new spring loaded CB antenna mount which may be easily and efficiently manufactured and marketed.

It is a further object of the present invention to provide a new spring loaded CB antenna mount which is of a durable and reliable construction.

An even further object of the present invention is to provide a new spring loaded CB antenna mount which is susceptible of a low cost of manufacture with regard to both materials and labor, and which accordingly is then susceptible of low prices of sale to the consuming public, thereby making such spring loaded CB antenna mount economically available to the buying public.

Still yet another object of the present invention is to provide a new spring loaded CB antenna mount which provides in the apparatuses and methods of the prior art some of the advantages thereof, while simultaneously overcoming some of the disadvantages normally associated therewith.

Still another object of the present invention is to provide a new spring loaded CB antenna mount for conveniently mounting a citizen band radio antenna to a vehicle without inflicting damage thereon.

Even still another object of the present invention is to provide a new spring loaded CB antenna mount that includes a first member and a second member movably coupled to the first member. A spring is situated between the first member and the second member for urging the same together for coupling to an exterior of a vehicle. An antenna is mounted to one of the members and extends upwardly therefrom.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new spring loaded CB antenna mount according to the present invention.

FIG. 2 is a side view of the L-shaped antenna mounting bracket of the present invention.

FIG. 3 is a side view of the J-shaped hooks of the present invention.

FIG. 4 is a cross-sectional view of the pipes of the present invention take along line 4—4 shown in FIG. 1.

FIG. 5 is an exploded view of the present invention.

DESCRIPTION OF THE PREFERRED EMBODIMENT

With reference now to the drawings, and in particular to FIGS. 1 through 5 thereof, a new spring loaded CB antenna mount embodying the principles and concepts of the present invention and generally designated by the reference numeral 10 will be described.

The present invention, as designated as numeral 10, includes a hollow rigid bottom pipe 12 with a first diameter and having a pair of open ends. A pair of diametrically opposed bores 14 are formed in a bottom end of the bottom pipe. Associated therewith is a hollow rigid top pipe 16 with a second diameter less than the first diameter and a similar length. The top pipe has a pair of open ends and a pair of diametrically opposed bores 18 formed in a top end thereof. In the preferred embodiments a top end of the top pipe is closed. As shown in FIG. 4, a bottom of the top pipe is slidably situated within a top of the bottom pipe. In the preferred embodiment, both pipes are formed of galvanized pipe.

Next provided is a pair of J-shaped hooks 20 each formed of a planar rectangular inboard plate, outboard plate and interconnect plate. As shown in FIG. 5, the inboard plate of each hook has an aperture formed therein. The pair of J-shaped hooks include a first J-shaped hook 22 having the inboard plate thereof mounted to the top of the top pipe via a bolt. Such bolt extends through the top pipe. When mounted, the first J-shaped hook is maintained in an inverted orientation. The J-shaped hooks further include a second J-shaped hook 24 having the inboard plate thereof mounted to the bottom of the bottom pipe. Similar to the first J-shaped hook, the second hook is mounted via a bolt which extends through the bottom pipe. The second J-shaped hook remains upright when mounted.

Further included is an antenna mounting bracket 26 having a planar rectangular first plate 27 with a bore formed in each corner thereof. An inverted L-shaped second plate 28 is provided with a bore formed in each corner of a vertical extent thereof. During use, a citizen band antenna 32 is mounted to a horizontal extent of the second plate and extends upwardly in perpendicular relationship therewith. FIG. 2 shows the vertical extent of the second plate being maintained in abutment with the top of the bottom pipe via a plurality of bolts 34 which extend through the bores of the first plate and subsequently through those of the vertical extent of the second plate. As shown, the bolts reside on opposite sides of the bottom pipe.

For preventing a wire 36 associated with the antenna from remaining loose, a plurality of straps 38 are coupled about the bottom pipe and situated about the wire. Note FIGS. 1 & 5. Such straps preferably have a slotted end and a free end, whereby upon the free end being strung through the slotted end, the ends are permanently coupled. It should be noted that the wire is preferably screwably coupled to the antenna and antenna mounting bracket to allowing convenient decoupling. Note FIG. 2. Finally, a metal coil spring 40 is situated within the top and bottom pipe. Such spring is connected between the bolts thereof for urging the J-shaped hooks toward each other.

By this structure, the hooks may be removably engaged with a top rain gutter and a bottom window sill of a vehicle when use of the antenna is desired. Such mounting may be accomplished without damaging the vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A releasably mounted antenna assembly comprising, in combination:

a hollow rigid bottom pipe with a first diameter and having a pair of open ends and a pair of diametrically opposed bores formed in a bottom end thereof;

a hollow rigid top pipe with a second diameter less than the first diameter and having a pair of open ends and a pair of diametrically opposed bores formed in a top end thereof, whereby a bottom of the top pipe is slidably situated within a top of the bottom pipe;

a pair of J-shaped hooks each formed of a planar rectangular inboard plate, outboard plate and interconnect plate, wherein the inboard plate has an aperture formed therein, the pair of J-shaped hooks including a first J-shaped hook having the inboard plate thereof mounted to the top of the top pipe via a bolt which extends through the top pipe, wherein the first J-shaped hook is maintained inverted, the J-shaped hooks further including a second J-shaped hook having the inboard plate thereof mounted to the bottom of the bottom pipe via a bolt which extends through the bottom pipe, wherein the second J-shaped hook remains upright;

an antenna mounting bracket including a planar rectangular first plate with a bore formed in each corner thereof and an inverted L-shaped second plate with a bore formed in each corner of a vertical extent thereof, wherein an antenna is mounted to a horizontal extent of the second plate and extends upwardly in perpendicular relationship therewith, the vertical extent of the second plate being maintained in abutment with the top of the bottom pipe via a plurality of bolts which extend through the bores of the first plate and subsequently through those of the vertical extent of the second plate;

a plurality of straps coupled about the bottom pipe and situated about a wire connected to the antenna; and a spring situated within the top and bottom pipe and connected between the bolts thereof for urging the J-shaped hooks toward each other.

2. A releasably mounted antenna assembly comprising:

a lower first member;

an upper second member telescopingly coupled within the first member;

a spring situated between the first member and the second member for urging the same together for coupling to an exterior of a vehicle, wherein the spring remains within both of the members;

an antenna mounted to one of the members and extending upwardly therefrom;

an antenna mounting bracket including a first plate with a bore formed in each corner thereof and an inverted L-shaped second plate with a bore formed in each corner of a vertical extent thereof, wherein an antenna is mounted to a horizontal extent of the second plate and extends upwardly in perpendicular relationship therewith, the vertical extent of the second plate being maintained in abutment with a top of the first member at an interconnection of the members via a plurality of bolts which extend through the bores of the first plate and subsequently through those of the vertical extent of the second plate; and a plurality of vertically spaced straps for securing a wire associated with the antenna adjacent to the first member for preventing the antenna wire from catching on objects and being inadvertently removed.

3. A releasably mounted antenna assembly as set forth in claim 2 wherein each member is equipped with a J-shaped hook.

4. A releasably mounted antenna assembly as set forth in claim 3 wherein one of the hooks remains upright and a second one of the hooks remains inverted.

* * * * *